United States Patent [19]
Lister et al.

[11] Patent Number: 5,185,087
[45] Date of Patent: Feb. 9, 1993

[54] METHOD OF CONCENTRATING AND DEODORIZING RUMINANT WASTE

[76] Inventors: Roy D. Lister, 457 Pine Tree Cir., Keller, Tex. 76248; Sabino Cortez, 1135 W. Elm, Stephville, Tex. 76401

[21] Appl. No.: 687,556

[22] Filed: Apr. 19, 1991

[51] Int. Cl.⁵ .............................. B01D 21/26
[52] U.S. Cl. .................... 210/787; 210/783; 210/806; 210/512.1; 209/144; 209/211
[58] Field of Search ............... 210/780, 783, 787, 806, 210/262, 295, 297, 400, 401, 512.1, 512.2; 209/13, 17, 144, 211, 307

[56] References Cited

U.S. PATENT DOCUMENTS

| | | | |
|---|---|---|---|
| 3,959,135 | 5/1976 | Shattock | 210/400 |
| 3,989,628 | 11/1976 | Bier | 210/806 |
| 4,541,933 | 9/1985 | Arnold et al. | 210/806 |
| 4,634,535 | 1/1987 | Lott | 210/806 |
| 4,818,400 | 4/1989 | Russell et al. | 210/400 |

*Primary Examiner*—Robert A. Dawson
*Assistant Examiner*—David Reifsnyder
*Attorney, Agent, or Firm*—Geoffrey A. Mantooth

[57] ABSTRACT

Apparatus for concentrating and deodorizing ruminant waste effluent. The effluent is passed thru a hydrocyclone. The conentrated, deodorized solids waste is suitable for disposal or can be further processed to turn it into fertilizer. The cleaned water can be discarded or reused.

7 Claims, 1 Drawing Sheet

METHOD OF CONCENTRATING AND DEODORIZING RUMINANT WASTE

BACKGROUND OF THE INVENTION

This invention relates to a concentrating and deodorizing method and apparatus for ruminant waste effluent.

While the method and apparatus of the present invention have many applications in the separation of waste solids from liquids, its utility in connection with the separation of dairy cow manure from wash water will be described.

In a typical dairy farm operation, a thousand milk cows will excrete an average of 18 pounds of waste product each per day. This waste is washed out of the barns into a series of settling pits which flow into lagoons. This is a very inefficient system, since the waste product does not settle very fast and most of it ends up in the lagoons, where it forms hard, crusty, odorous, difficult to handle material. The lagoons are dredged periodically at a great expense to the farmers and pollution occurs when rain causes the lagoons to spill over onto the surrounding countryside. There has been no attractive solution to this problem for many years.

An objective of the present invention has been to deal with the problem of effluent from the dairy farms.

Another objective of the invention has been to provide a method and apparatus for concentrating ruminant waste products.

Another objective of the invention had been to provide a method and apparatus for deodorizing ruminant waste products.

The objects of the invention are achieved by utilizing a hydrocyclone process.

The hydrocyclone is a cone shaped device that receives liquid, usually under pressure from a pump, on a tangent to the inside wall, which causes the liquid to spin, accelerating the force of gravity on the solids. Liquid, essentially free of solids exits out the top of the hydrocyclone. The concentrated solids exit out of the bottom of the hydrocyclone. The substantially clean water may be discharged or reused for washing. The solids may be collected in an area to allow excess water to drain off.

Because of the vortex generated by the hydrocyclone as the liquid is spinning in it, an area of low pressure develops along the central axis of the device, which causes air to be sucked up into it. As this air comes into intimate contact with bacteria in the waste product, most of the bacteria are destroyed, thus eliminating the source of much of the odor associated with these waste products.

The concentrated, dewatered deodorized solids can now be readily disposed of, or with further processing, be pelletized for use as fertilizer.

The several features and objectives of the present invention will become more readily apparent from the following detailed description taken in conjunction with the accompanying drawings in which.

Figure 1:
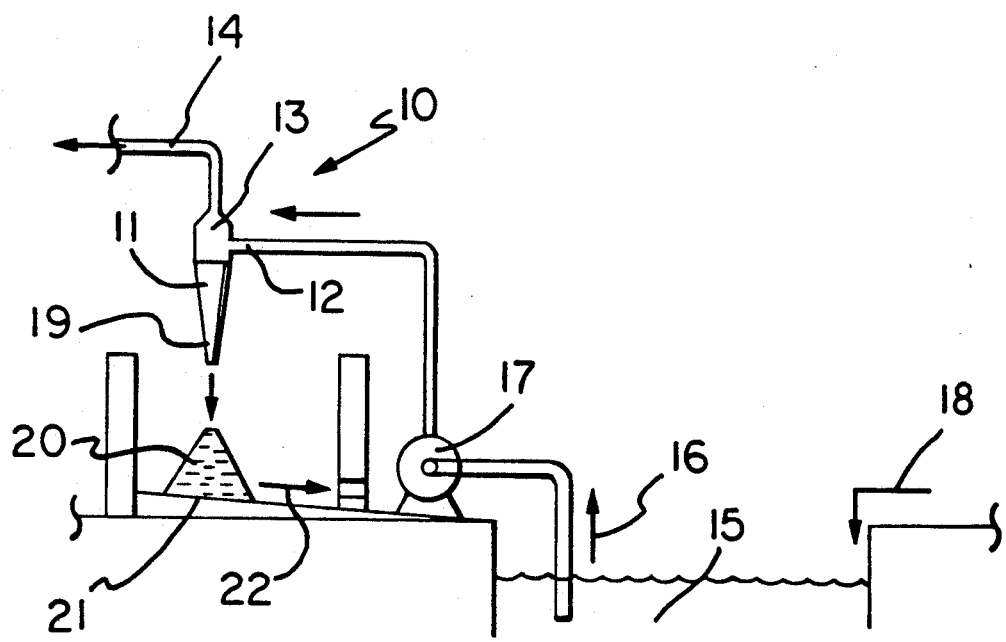
FIG. 1 is a diagrammatic side elevational view of the invention.

The apparatus is shown at 10 in FIG. 1. Its major component is the hydrocyclone 11.

The hydrocyclone has an inlet 12 by which the slurry to be separated is introduced into the system. The hydrocyclone has an upper end 13 out of which the cleaned fluid flows. A conduit 14 is provided to carry that overflow away for reuse, disposal or recycle back to the pit 15. The pit 15 provides the feed slurry 16 to the pump 17 which supplies the pressure energy for separation. Effluent from the dairy barns enters the pit 15 as depicted by arrow 18. The hydrocyclone has a lower end 19 out of which the underflow is discharged. The wet waste solids 20 may be collected on an incline 21 to allow for further dewatering before disposal or further processing. The arrow 22 depicts water draining from the collected solids running back into the pit.

In operation, effluent from a dairy barn, i.e., cow waste plus wash water, flows by gravity into a pit, where a pump picks it up and transfers it under pressure to the hydrocyclone. Substantially clean water exits out of the overflow of the hydrocyclone and may be directed back into the pit for further cleaning, or diverted to a lagoon, or used for some other purpose, such as washing. The underflow containing the solids, primarily dirt and animal waste, exits out the bottom of the hydrocyclone, forming a pile of material. Water from this pile of material drains back into the pit down a slight incline. The dewatered solids will periodically be removed by a front end loader for disposal or further processing into fertilizer.

Figure 2:
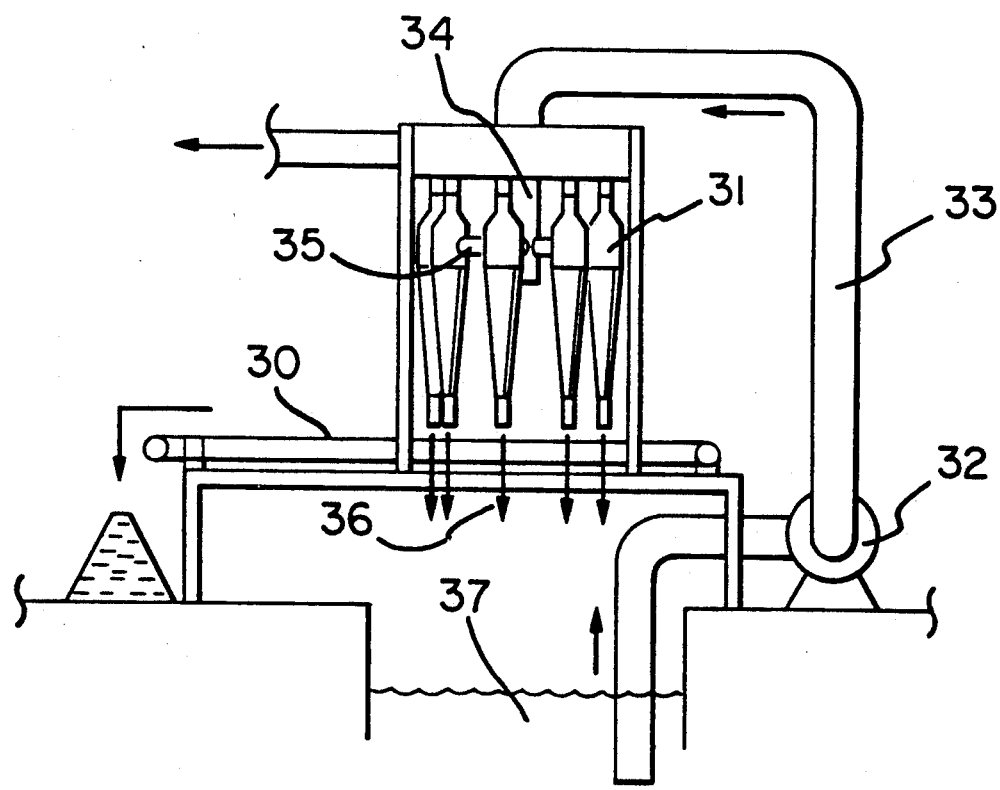
FIG. 2 is a side elevational view of a further embodiment of the invention.

The modified form of the invention is shown in FIG. 2. There a filter belt 30 has an upper flight that is about eight feet long and three feet wide. Overlying the upstream end of the filter belt is a cluster of hydrocyclones 31, eight hydrocyclones being disposed equally spaced in a circle overlying the filter belt. Of course, other manifolding arrangements of the hydrocyclones could be used. A pump 32, is connected to a pipe 33 for bringing the slurry to the hydrocyclones. The slurry is brought to a manifold pipe 34 from which it is distributed to distributor pipes 35 connected to tangential or volute inlets of the respective hydrocyclones 31. The filtrate 36, free of large solids, passes through the filter belt and flows back into the pit 37, which is the source of the feed to the separating system and contains the run off from the dairy barns.

In this embodiment, whose purpose is to process more slurry and automate the dewatering of the solids, the upper flight of the filter belt moves in the direction of the arrow at a rate less than three feet per minute. Each hydrocyclone delivers about one to five gallons of concentrated slurry per minute at its underflow. In this embodiment, approximately 24,000 gallons of effluent are processed every hour, with the resultant 1,000 pounds per hour of filtered material having a consistency of between 50-70% solids.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. A method of concentrating ruminant waste effluent, said effluent comprising ruminant waste and water, comprising the steps of:

collecting said effluent;

subjecting said collected effluent to cyclonic action so as to separate a major portion of the water from said effluent thereby concentrating the ruminant waste products.

2. The method of claim 1 further comprising the step of placing said concentrated ruminant waste products in a drainage area so as to allow further dewatering of said concentrated ruminant waste products.

3. A method of treating ruminant waste effluent, said effluent comprising water and ruminant waste, comprising the steps of:
   pressuring said effluent;
   directing said pressurized effluent into a means for hydrocycloning;
   separating said water from said ruminant waste in said means for hydrocycloning.

4. The method of claim 3 further comprising the step of directing said separated water from said means for hydrocycloning to a means for serving as a lagoon.

5. The method of claim 3 further comprising the step of placing said concentrated ruminant waste products in a drainage area so as to allow further dewatering of said concentrated ruminant waste products.

6. The method of claim 5 further comprising the step of using said separated and drained ruminant waste as fertilizer.

7. The method of claim 3 further comprising the step of using said separated ruminant waste as fertilizer.

* * * * *